United States Patent [19]

Veasley et al.

[11] Patent Number: 5,024,880

[45] Date of Patent: Jun. 18, 1991

[54] CELLULAR PRESSURE-SENSITIVE ADHESIVE MEMBRANE

[75] Inventors: George F. Veasley, Hudson, Wis.; Jurgen Klingen, Schwalmtal, Fed. Rep. of Germany; Donald T. Landin, Eagan, Minn.

[73] Assignee: Minnesota Mining and Manufacturing Company, St. Paul, Minn.

[21] Appl. No.: 460,621

[22] Filed: Jan. 3, 1990

[51] Int. Cl.$^5$ .......................... B32B 3/26; B32B 7/12; B32B 15/04

[52] U.S. Cl. .................................. 428/317.5; 428/343; 428/345; 428/355

[58] Field of Search .............. 428/345, 343, 355, 317.5

[56] References Cited

U.S. PATENT DOCUMENTS

| | | | |
|---|---|---|---|
| Re. 24,906 | 12/1960 | Ulrich | 296/59 |
| 2,956,904 | 10/1960 | Hendricks | 117/93 |
| 3,565,247 | 2/1971 | Brochman | 206/59 |
| 3,615,972 | 10/1971 | Morehouse et al. | 156/79 |
| 3,832,274 | 8/1974 | Owston | 161/183 |
| 4,075,138 | 2/1978 | Garner | 260/2.5 |
| 4,126,504 | 11/1978 | Wolinski et al. | 156/310 |
| 4,181,752 | 1/1980 | Martens et al. | 427/54.1 |
| 4,223,067 | 9/1980 | Levens | 428/308 |
| 4,243,500 | 1/1981 | Glennon | 204/159.12 |
| 4,287,308 | 9/1981 | Nakayama et al. | 521/53 |
| 4,303,485 | 12/1981 | Levens | 204/159.24 |
| 4,329,384 | 5/1982 | Vesley et al. | 428/40 |
| 4,330,590 | 5/1982 | Vesley | 428/336 |
| 4,364,972 | 12/1982 | Moon | 427/54.1 |
| 4,378,278 | 3/1983 | Allaway et al. | 204/159.22 |
| 4,379,201 | 4/1983 | Heilmann et al. | 428/345 |
| 4,391,687 | 7/1983 | Vesley | 204/159.16 |
| 4,415,615 | 11/1983 | Esmay et al. | 428/40 |
| 4,599,265 | 7/1986 | Esmay | 428/355 |
| 4,612,242 | 9/1986 | Vesley et al. | 428/313.9 |
| 4,666,771 | 5/1987 | Velsey et al. | 428/325 |
| 4,710,536 | 12/1987 | Klingen et al. | 524/493 |
| 4,767,793 | 8/1988 | Schisler et al. | 521/50.5 |
| 4,818,610 | 4/1989 | Zimmerman et al. | 428/345 |
| 4,855,170 | 8/1989 | Darvell et al. | 428/40 |
| 4,913,960 | 4/1990 | Kuroda et al. | 428/345 |

FOREIGN PATENT DOCUMENTS 192688 8/1985 Canada .
238863 9/1987 European Pat. Off. .

*Primary Examiner*—George F. Lesmes
*Assistant Examiner*—D. R. Zirker
*Attorney, Agent, or Firm*—Gary L. Griswold; Walter N. Kirn; Darla P. Neaveill

[57] ABSTRACT

Phase-separated, polymerized, cellular pressure-sensitive adhesive membranes possessing a high degree of compression recovery comprising from about 70 parts to about 98 parts of an acrylic polymer containing at least about 75 parts of an alkyl acrylate monomer, the alkyl groups of which have an average of 4 to 12 carbon atoms, and from 0 to about 25 parts of a monoethylenically unsaturated polar copolymerizable monomer, and correspondingly, from about 30 parts to about 2 parts of a saturated hydrocarbon elastomer or blend of hydrocarbon elastomers containing at least one segment having a lower glass transition temperature than the acrylic copolymer. The adhesive has at least a first phase and a second phase, the first phase consisting primarily of the elastomer, and at least one phase is a continuous phase. Cellular pressure-sensitive adhesive membranes of the invention have improved low temperature shock resistance over otherwise identical cellular pressure-sensitive adhesive membranes containing no elastomer.

19 Claims, 6 Drawing Sheets

CELLULAR PRESSURE-SENSITIVE ADHESIVE MEMBRANE

BACKGROUND OF THE INVENTION

1. Field of the Invention

This invention relates to pressure-sensitive adhesive compositions and adhesive tapes, specifically acrylic-based cellular pressure-sensitive adhesive membranes having improved internal strength, excellent conformability and good low-temperature performance.

2. Description of the Related Art

Acrylate pressure-sensitive adhesives are well known in the art. In U.S. Pat. No. Re 24,906 (Ulrich), alkyl acrylate copolymers are described which are predominately alkyl esters of acrylic acid having from 4 to 14 carbon atoms, and further comprise a minor amount (3-12%, preferably 4-8%) of a polar copolymerizable monomer such as acrylic acid. Such adhesives are widely popular as they are readily available and provide a good balance of tack, shear and peel properties on a variety of substrates at a relatively low cost.

These adhesives have been used for various automotive applications, e.g., attachment of decorative items to the painted surface. Automotive industry testing of adhesives typically subjects adhesives to a shock test, known in the industry as a "cold slam" test, at temperatures down to −45° C. These conventional acrylate adhesives have difficulty performing well on such tests, especially at the lower temperatures on new high solids paints systems which are increasingly used in the automotive industry.

U.S. Pat. No. 4,181,752 (Martens et al) discloses a process for ultraviolet photopolymerization of alkyl acrylate esters and polar copolymerizable monomers to form the acrylate copolymer. Martens teaches that intensity and spectral distribution of the irradiation must be controlled in order to attain desirable cohesive strengths and peel resistance. The photopolymerization is preferably carried out in an inert atmosphere as oxygen tends to inhibit the reaction. Adhesive properties for tapes made via the Martens process are improved over those made by solution polymerization, but still do not perform adequately on the automotive testing at the lowest temperatures.

Additional patents disclose ultraviolet radiation of acrylate adhesives. U.S. Pat. No. 4,364,972 (Moon) discloses the use of N-vinylpyrrolidone as the polar copolymerizable monomer in the acrylate adhesive copolymer. High adhesion to automotive paints is disclosed but not exemplified. U.S. Pat. No. 4,391,687 (Vesley) discloses the use of specific chromophore-substituted-halomethyl-s-triazines as photoactive crosslinkers for acrylate copolymers. U.S. Pat. No. 4,599,265 (Esmay) discloses a readily peelable pressure-sensitive adhesive tape, the adhesive layer of which is highly crosslinked and low in polar monomer content. While properties vary, none of these adhesives show improvements at the lowest temperatures on the automotive testing.

U.S. Pat. No. 4,243,500 (Glennon) discloses a pressure-sensitive adhesive formed from a composition comprising at least one monofunctional unsaturated acrylate ester monomer, saturated tackifying resin polymers, non-crystallizing elastomeric material, and an initiator responsive to ultraviolet light or other penetrating radiation. Glennon specifies the use of UV light within a wavelength range of 1800–4000 Angstroms. The intensity of the lamps to which the adhesive is exposed is much higher than that of the lamps disclosed in Martens et al.

Glennon states that the elastomer may be any natural or synthetic elastomer which is soluble in the acrylate ester monomer and which is of a non-crystallizing amorphous nature. The elastomer is present in from about 4 parts to about 150 parts per hundred parts acrylate monomer. The Glennon adhesive also requires the use of from about 50 parts to about 250 parts of tackifying resin per hundred parts acrylate ester monomer in order to obtain a satisfactory adhesion level to metal and painted steel substrates. Such levels of tackifier increase the glass transition temperature of the polymer matrix which has a negative effect on low temperature flexibility, and act as chain transfer agents during the polymerization. Further, tackifiers tend to migrate to the surface of the adhesive upon aging, causing the adhesion to deteriorate. Tapes made with Glennon adhesives will not pass the automotive testing.

Canadian Patent No. 1,192,688 (Moser et al.) discloses an adhesive composition comprising an acrylic monomer yielding a polymer with a glass transition temperature between 0° C. and 100° C. and at least one dispersible core-shell polymer, the composition being a 100% reactive fluid adhesive. Such adhesives cannot be used as pressure-sensitive adhesives.

European Patent Application, Publication No. 238863, (Klingler et al.) discloses a radiation or heat cured elastomer which exhibits enhanced physical properties by virtue of its cure resulting in phase segregation. The elastomer is dissolved in a methacrylate monomer in the presence of a photoinitiator or thermal initiator. The composition may also contain up to 20% by weight of a reactive acrylic diluent. Operable block copolymers include styrene/elastomer block copolymers, polyurethane block copolymers and polyester/polyether block copolymers. Acrylates analogous to the useful methacrylates are disclosed to yield a transparent non-phase-segregated product which exhibits markedly inferior physical properties.

U.S. Pat. No. 4,126,504, (Wolinski et al.) discloses a two-part fast curing adhesive wherein the first part is made up of a thermoplastic non-reactive elastomeric polymer dissolved in a free-radical addition polymerization combination of an acrylic or methacrylic monomer, a copolymerizable monomer containing at least one free carboxylic acid group, and a non-activated free radical addition polymerization catalyst system. The second part comprises an activator system for the free radical catalyst system, and optional accelerator for such system. In one modification, the activator may be encapsulated into insoluble, rupturable microspheres to form a single liquid adhesive. The adhesives disclosed in Wolinski must be applied to one surface, and the activator applied to the other surface, or in the case of single liquid adhesive, a catalyst must still be added at the time of use. The adhesives are, therefore, not appropriate for use as pressure-sensitive adhesives.

U.S. Pat. No. 3,832,274, (Owston) discloses fast-curing structural adhesives comprising (a) from about 1 to about 30% of an elastomer polymer selected from poly(butadiene) homopolymer, copolymers of butadiene with at least one copolymerizable monomer such as styrene, acrylonitrile and methacrylonitrile, and a copolymer of butadiene selected from the group consisting of homopolymer and copolymer modified by inclusion of up to 5% of a functional monomer; (b) 25% to 85% of at least one polymerizable acrylic monomer selected from acrylates methacrylates, acrylonitrile and methacrylonitrile; (c) 0 to 50% of an ethylenically unsaturated non-acrylic monomer; (d) polymers having intrinsic viscosity in the range from about 0.1 to 1.3, derived from (b) or (c); (e) 5% to 20% of methacrylic acid; and (f) 0.04% to 4% of the reducing component of a redox catalyst polymerization system. The oxidizing component of such catalyst system must be added within fifteen minutes of cure time after the adhesive is in place. The adhesives are structural cements, and are not suitable for use as pressure-sensitive adhesives.

Foam or foam-like adhesives are also well known in the art. This type of adhesive is desirable for adhesion to rough surfaces, or in situations where the adhesive may be subject to compression.

U.S. Pat. No. 4,223,067, (Levens) discloses a glass microbubble-containing acrylic pressure-sensitive adhesive. The adhesive is disclosed to have good shear and peel, and to conform well to rough and uneven surfaces.

Because the microbubble-containing tape of the Levens patent has a foam-like appearance and character, it is sometimes called a "foam-like" tape even though its pressure-sensitive adhesive layer is substantially free of voids except for the hollow spaces within the microbubbles. The Levens patent in turn teaches that, where it is desired to adhere the foam-like tape "to a surface to which its pressure-sensitive adhesive layer would not form a strong bond, it may be desirable to apply to one or both of its faces of its microbubble-filled adhesive layer a layer of unfilled pressure-sensitive adhesive which is especially selected for adhesion to that surface" (col. 4, lines 9–15). Such microbubble-free surface layers can also provide substantially increased cohesive strength, especially at high temperatures. Microbubble-free surface layers can have different adhesive properties, each selected for good adhesion to a certain surface. Because the application of those added layers substantially increase the cost of the foam-like tape, less expensive foam-backed tapes have dominated the market for uses requiring immediate adhesion to rough or uneven surfaces.

U.S. Pat. No. 3,565,247 (Brochman) concerns a pressure-sensitive adhesive tape, the adhesive layer of which is a foam. To make such a tape, a blowing agent and a nucleating-reinforcing agent such as fumed silica are blended into a solution of a pressure-sensitive adhesive. After this blend is coated, it is heated to evaporate the solvent. The temperature is then increased to that necessary to decompose the blowing agent, causing it to release a gas which forms minute microcells throughout the dried pressure-sensitive adhesive layer.

U.S. Pat. No. 4,855,170 (Darvell et al.) discloses a pressure sensitive tape construction containing resilient polymeric microspheres.

U.S. Pat. No. 4,415,615, (Esmay, Johnson, Vesley), discloses a cellular pressure-sensitive adhesive comprising 15% to 85% voids that does not collapse after being briefly compressed, has good adhesion on contact with rough surfaces, and conformability at sub-freezing temperatures, i.e., temperatures down to about 40° C.

U.S. Pat. No. 4,767,793 (Schisler et al.) discloses a process of producing a foamed polymer by mechanically frothing a radiation-curable composition and curing the foam composition. Foam laminates for use as printing blankets are disclosed to contain various types of polymers, including a layer containing elastomers.

The laminate may have an adhesive layer laminated thereto. Radiation-cured pressure-sensitive adhesives are not disclosed.

The adhesive layer of Esmay is made by frothing an acrylate monomer mixture composition which is photopolymerizable to a pressure-sensitive adhesive state and coating that froth onto a backing, and photopolymerizing to a pressure-sensitive adhesive having a cellular structure. The cellular adhesive layer of the Esmay tape comprises at least 15% voids by volume, and recovers substantially its original thickness after compression.

However, the action of frothing the acrylic polymer matrix reduces the internal strength of these cellular pressure-sensitive adhesive membranes relative to non-frothed samples.

U.S. Pat. No. 4,378,278, (Allaway et al.) discloses a polymeric foam made by mixing a liquid multi-functional acrylate monomer and a liquid nonionic fluorinated alkyl-ester surfactant, foaming the surfactant and monomer and exposing the mixture to electron beam radiation.

The inventors of the present invention have now discovered that certain ultraviolet-radiation polymerized phase-separated cellular pressure-sensitive adhesive membranes comprising an acrylic polymer containing an alkyl acrylate monomer and a polar monomer, and a saturated hydrocarbon elastomer, or blend of hydrocarbon elastomers, each elastomer having at least one segment with a glass transition temperature lower than that of the acrylic polymer, exhibit improved internal strength of the membrane while exhibiting excellent conformability and adhesion properties.

SUMMARY OF THE INVENTION

The present invention provides an acrylic cellular pressure-sensitive adhesive membrane containing a surfactant and a saturated hydrocarbon elastomer.

This cellular pressure-sensitive adhesive has improved internal strength and excellent cold shock resistance while retaining the excellent conformability and adhesion for which such adhesives are noted. Further, the addition of such elastomer allows higher strongly polar monomer levels to be used without negatively affecting the conformability of the membrane.

More specifically, pressure-sensitive adhesive membranes of the invention comprise phase-separated, cellular pressure-sensitive adhesive membranes surrounding, and thereby defining, a multiplicity of small voids, constituting from 15% to 85% of the volume of the membrane, the membrane thereby possessing a high degree of compression recovery, comprising
(a) from about 70 parts to about 98 parts of an acrylic polymer of monomers containing:
  (i) at least about 75 parts of an alkyl acrylate monomer, the alkyl groups of which have an average of 4 to 12 carbon atoms, and
  (ii) from 0 to about 25 parts of a monoethylenically unsaturated polar copolymerizable monomer, and
  (iii) from about 0.01 part to about 1 part of a photoinitiator, and
  (iv) from about 0.1 part to about 5 parts of a surfactant, and
(b) correspondingly, from about 30 parts to about 2 parts of a saturated hydrocarbon elastomer or blend of hydrocarbon elastomers containing at least one segment having a lower $T_g$ than the acrylic copolymer, wherein the adhesive has at least a first phase and a second phase, the first phase consisting primarily of the acrylic, and the second phase consisting primarily of the elastomer, at least one phase being a continuous phase. Cellular pressure-sensitive adhesive membranes of the invention have improved internal strength over otherwise identical cellular pressure-sensitive adhesive membranes containing either an equivalent amount of an unsaturated elastomer, or no elastomer.

The invention also provides pressure-sensitive adhesive tapes exhibiting improved "cold slam" performance without unacceptable modification of other critical properties.

DESCRIPTION OF THE ELECTRON MICROGRAPHS

In the following electron micrographs, the bar scale present in the lower right hand corner of each Figure represents one micron.

DETAILED DESCRIPTION OF THE INVENTION

Figure 1:
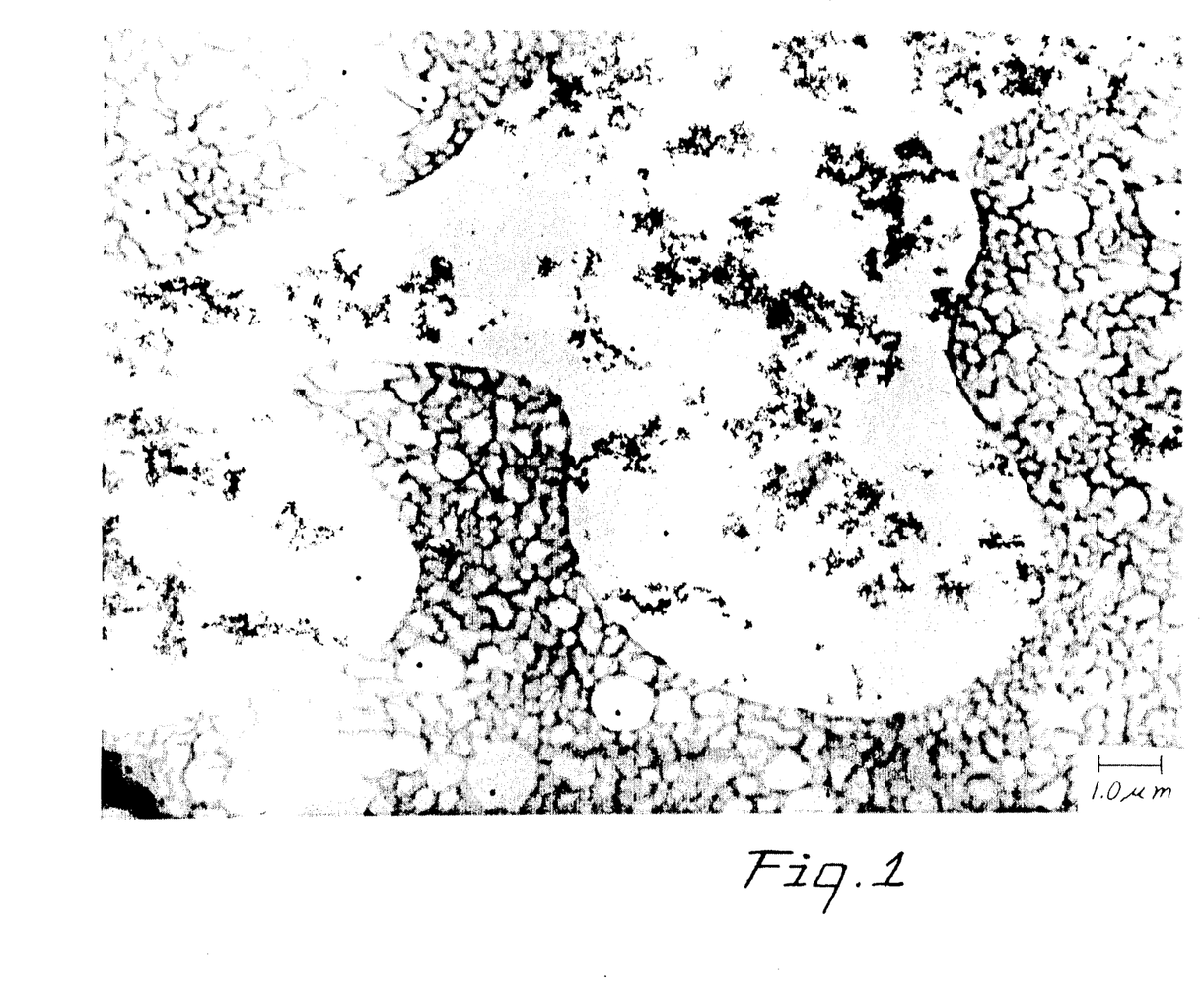
FIG. 1 shows the morphology of a noncellular acrylate pressure-sensitive adhesive polymer having the following composition: 91 parts of an acrylate copolymer with a 91/9 IOA/AA ratio, 0.18 part of a 2,2-dimethyl,2-phenyl acetophenone photoinitiator, 0.05 part 1,6 hexanedioldiacrylate (HDDA). Also 6 parts Aerosil TM R972 hydrophobic silica filler, and 9 parts Kraton TM 1657 were present per 100 parts acrylate copolymer. The composition contains no surfactant. The darkly stained first phase is the elastomer. The elastomer phase does not appear to be continuous throughout the sample. Large regions of the acrylic copolymer phase, devoid of elastomer are visible wherein the silica can be seen as dark particles in the light acrylic matrix.
Figure 2:
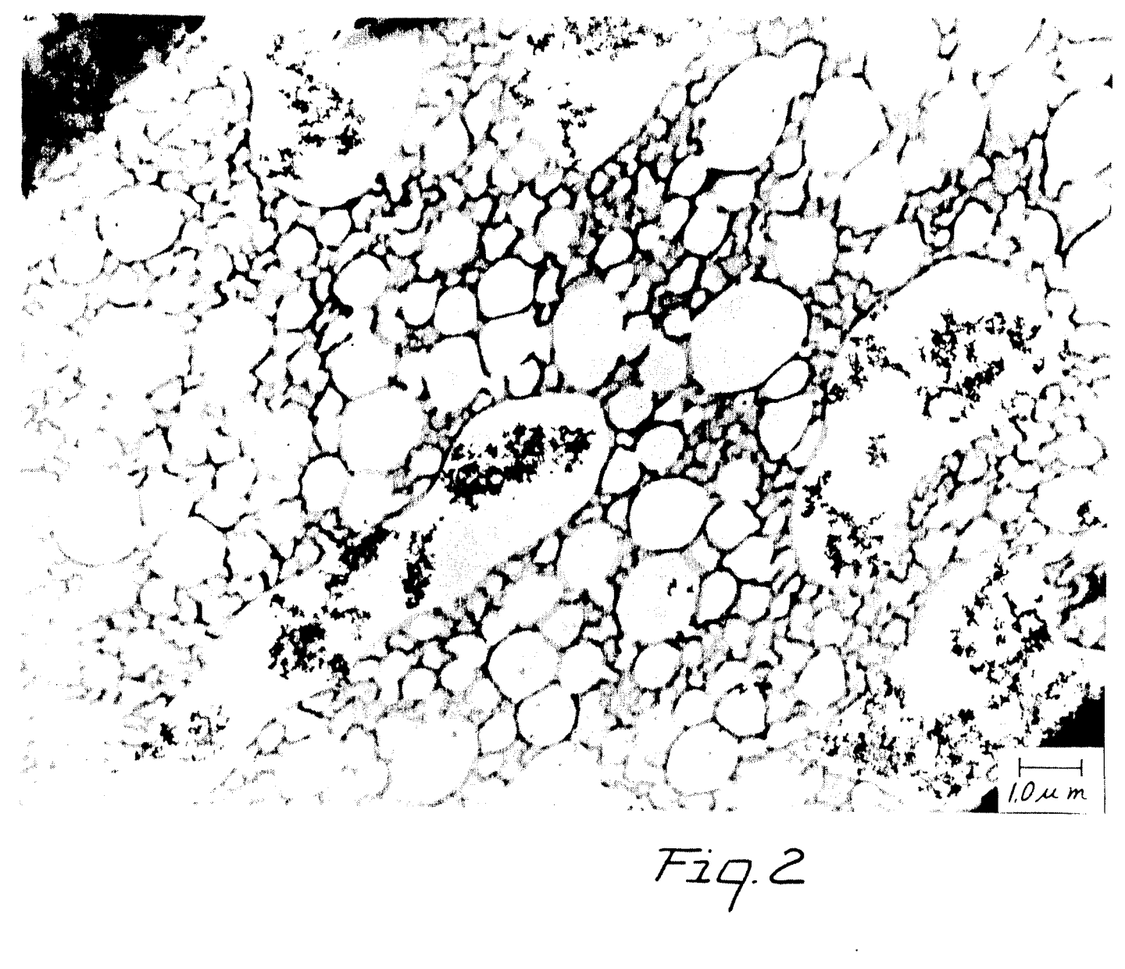
FIG. 2 shows the morphology of a similar non-cellular pressure-sensitive adhesive polymer containing 3.5% of a 60:40 mixture of surfactants C and B as described, infra. The elastomer phase is much more evenly distributed throughout the sample, and appears to be generally interconnected with acrylic inclusions. The acrylic inclusions in the elastomer phase are not regular in size; however, no large areas are devoid of elastomer as in FIG. 1.
Figure 3:
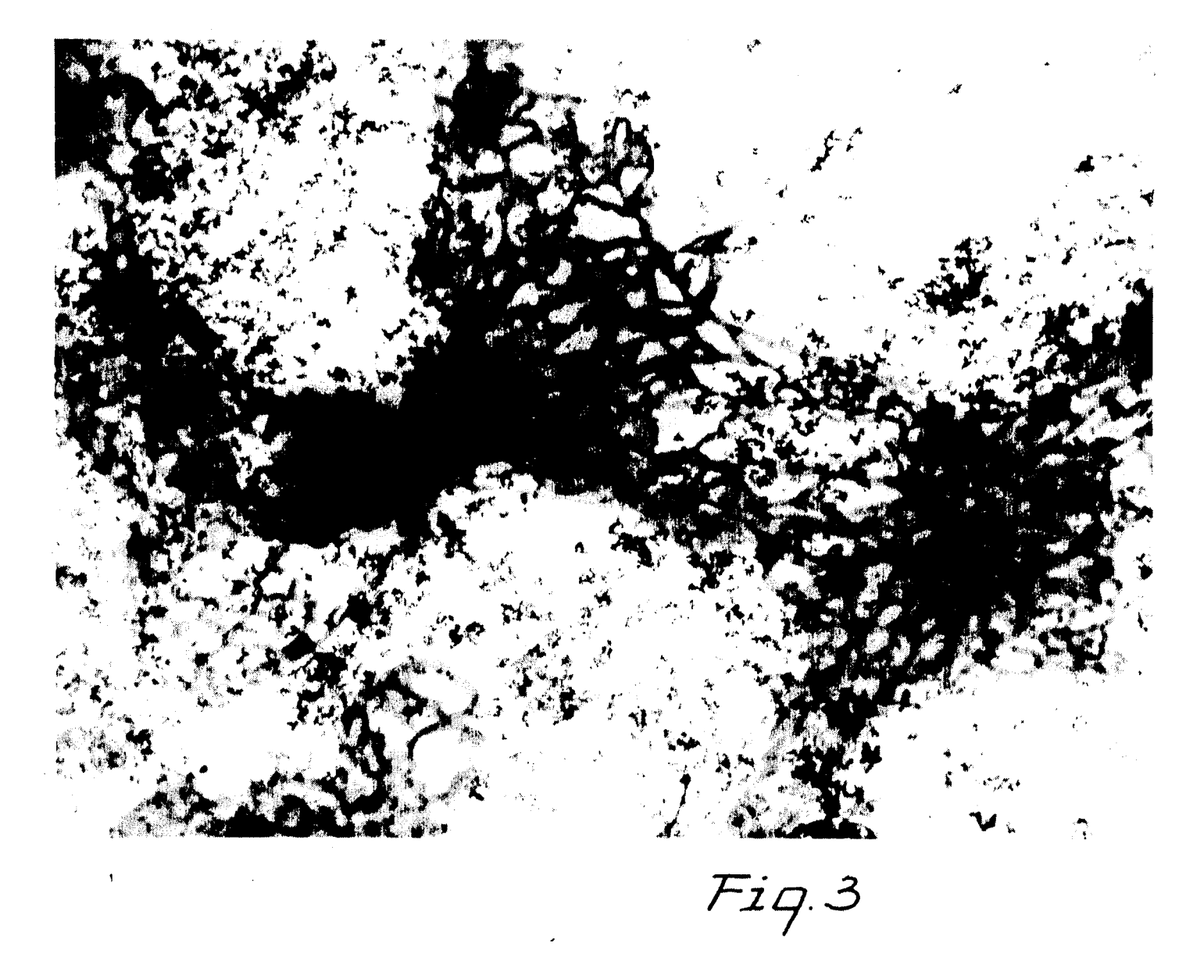
FIG. 3 shows the morphology of a cellular pressure-sensitive adhesive composition of the invention having an identical composition as the noncellular pressure-sensitive adhesive shown in FIG. 2. The elastomer phase and its cell-like domains are still visible; however, the high shear of the frothing mechanism has disturbed the distribution of the phase. The phase is now locally continuous, with large areas devoid of elastomer, but the phase appears to have remained largely interconnected.
Figure 4:
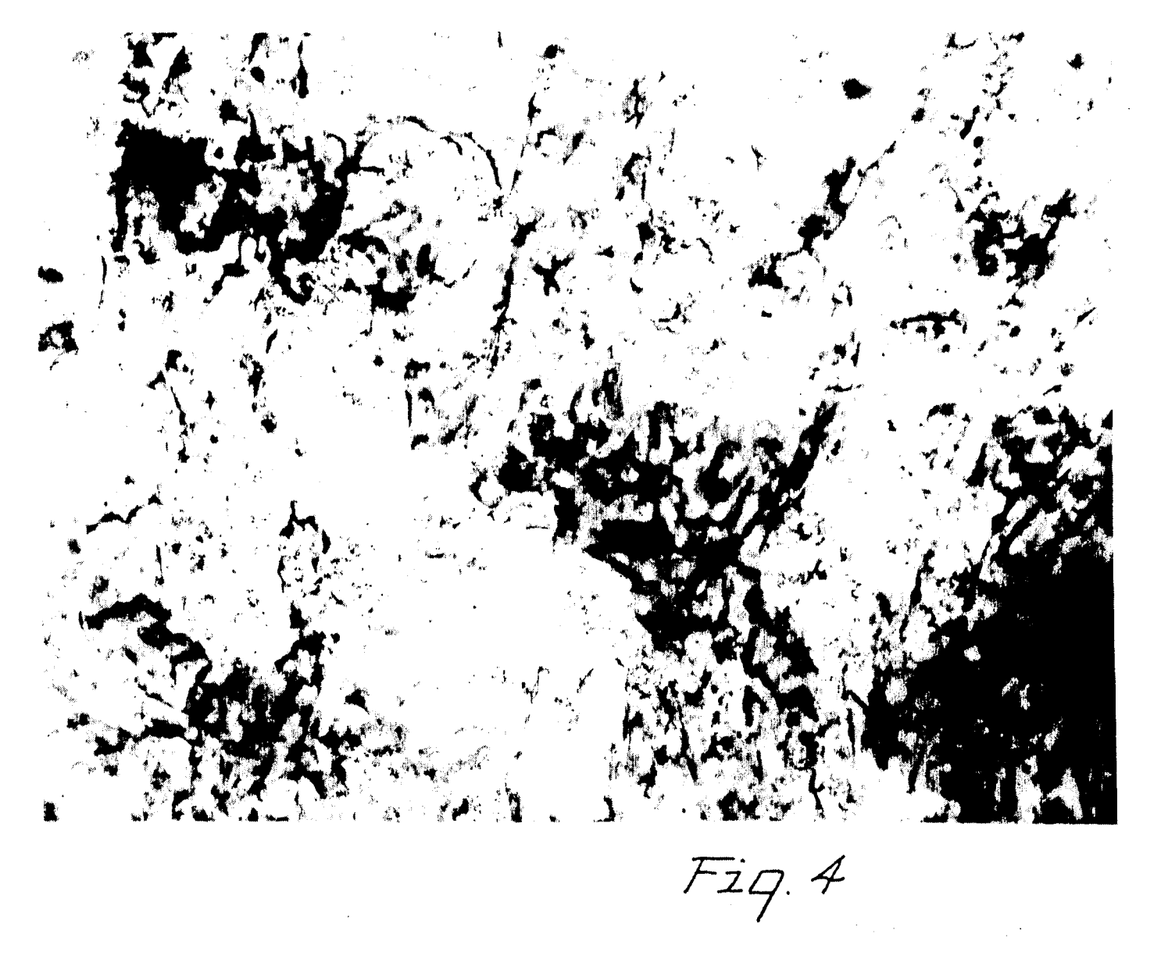
FIG. 4 shows the morphology of a cellular pressure-sensitive adhesive composition of the invention having 17 parts of the elastomer. The phase is still locally continuous, however, these areas are now larger. The phase remains largely interconnected.
Figure 5:
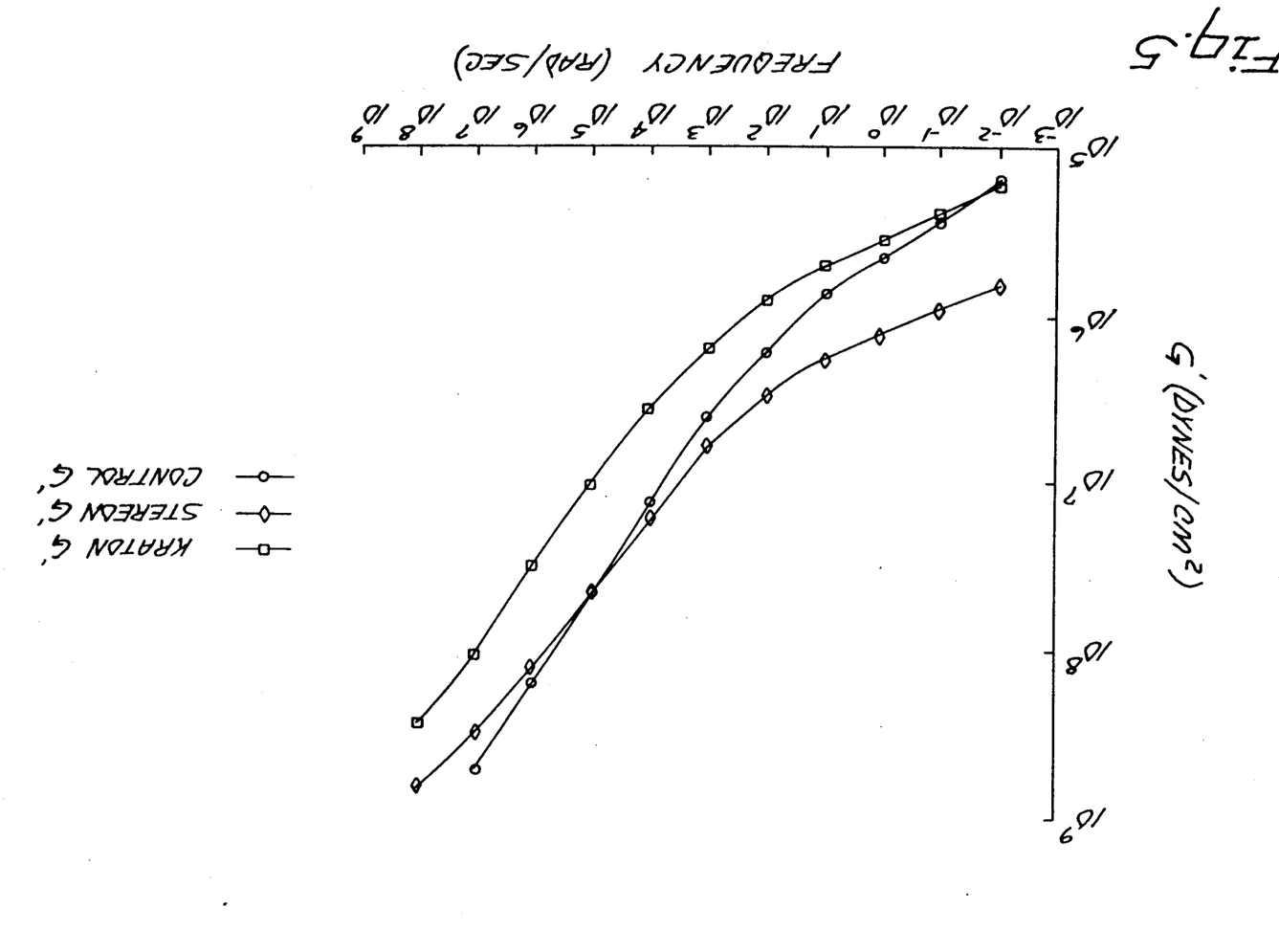
FIG. 5 shows the graphs of storage modulus over a range of frequencies for a control cellular pressure-sensitive adhesive membrane containing no elastomer, a cellular pressure-sensitive adhesive membrane containing an elastomer having unsaturated segments, and a cellular pressure-sensitive adhesive membrane of the invention. The lowered storage modulus of the latter can clearly be seen.
Figure 6:
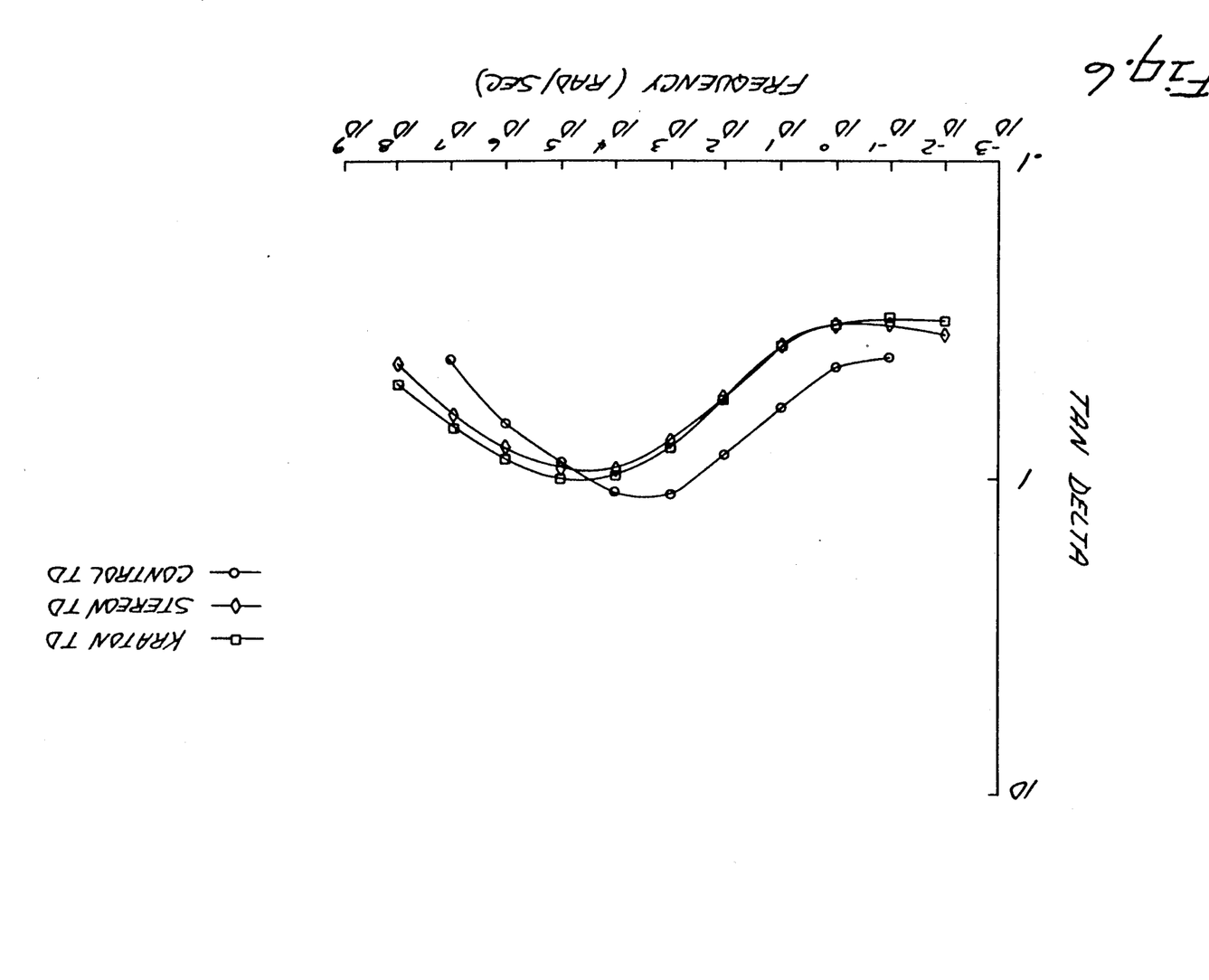
FIG. 6 shows the graphs of Tan Delta over a range of frequencies for the same compositions described for FIG. 5. The shift to higher frequencies by the cellular pressure-sensitive adhesive of the invention is clearly visible.

Acrylic cellular pressure-sensitive adhesive membranes of the invention preferably comprise a copolymer containing 75-100 parts of substituted or unsubstituted alkyl acrylate or methacrylate monomers (all of which are hereinafter collectively referred to as "acrylate monomer") and 0-25 parts of a polar copolymerizable monoethyleniclly substituted monomer; the ratios being selected such that after polymerization the foam membrane will have the required compression rheology. Useful acrylate monomers are monofunctional unsaturated acrylate esters of non-tertiary alkyl alcohols, the molecules of which have from 1 to about 14 carbon atoms. Included within this class of monomers are, for example, isooctyl acrylate, isononyl acrylate, isononyl methacrylate, 2-ethyl-hexyl acrylate, decyl acrylate, dodecyl acrylate, n-butyl acrylate, and hexyl acrylate. Preferred monomers include isooctyl acrylate, isononyl acrylate, and butyl acrylate.

The polar copolymerizable monomers can be selected from strongly polar monomers such as acrylic acid, itaconic acid, hydroxyalkyl acrylates, cyanoalkyl acrylates, acrylamides or substituted acrylamides, or from moderately polar monomers such as N-vinyl pyrrolidone, N-vinyl caprolactam, acrylonitrile, and vinyl chloride.

Elastomers useful in compositions of the invention are those saturated hydrocarbon elastomers which phase-separate when photopolymerized in adhesives with acrylic monomers. These elastomers include at least one low $T_g$ segment. Low $T_g$, as used herein, means that the segment so defined has a glass transition temperature lower than that of the UV radiation polymerized acrylic copolymer. Typical $T_g$ values for acrylate polymers are about 0° C. or lower. Low $T_g$ segments have T values of less than 0° C., preferably in the range of from −50° C. to −70° C., more preferably less than −70° C. The elastomer comprises from about 2 phr to about 30 phr, preferably from about 5 phr to about 15 phr, more preferably from about 7 phr to about 12 phr of adhesives of the invention.

Surprisingly, where desirable, such elastomer allows higher strongly polar monomer levels to be used without negatively affecting the conformability of the membrane. In cellular pressure-sensitive adhesive membranes without elastomer, the amount of strongly polar monomer useful is limited to about 15 parts or less. When more than about 15 parts strongly polar monomer is used, the resulting cellular membrane is excessively stiff, and has little conformability. When the cellular pressure-sensitive adhesive membrane contains a saturated hydrocarbon elastomer, up to 25 parts of strongly polar monomer may be used without sacrificing the conformability thereof.

Compositions containing saturated elastomers and a surfactant exhibit a phase-separated morphology wherein the first, and continuous phase is the acrylic copolymer phase. The elastomer phase is present as an interconnected network. The elastomer phase is locally continuous, but the size and distributions of the network are irregular. The large regions of acrylic copolymer are smaller and more similar in size than those present in otherwise identical compositions containing no surfactant. The presence of the elastomer phase provides an improvement in the level of shock resistance over that provided by a cellular pressure-sensitive adhesive containing no elastomer. Some improvement in cold-slam behavior is also seen.

Surprisingly, the cellular pressure-sensitive adhesive membranes incorporating a surfactant and such elastomers provide a significant increase in internal strength. The use of elastomers having only saturated segments may also be crucial when long term adhesive properties are a major consideration as the hydrogenation reduces the sites for degradation of the elastomer.

Without wishing to be bound by theory, it is believed that such a system exhibits improved low temperature properties because its unique morphology combines the efficient shock damping ability of the elastomer in continuous phase with the good adhesive properties of the acrylic copolymers, as described in U.S. Pat. No(s). RE 24,906, (Ulrich) 4,181,752, (Martens) and 4,223,067, (Levens), all of which are incorporated herein by reference.

Preferred elastomers include styrene ethylene-butylene styrene copolymers such as Kraton TM G1726 and Kraton TM G1657, both available commercially from Shell Chemical Company. The properties of specific cellular pressure-sensitive adhesive membranes of the invention vary depending on such factors as the type of elastomer selected and the amount used as well as the ratio of the monomers in the acrylic copolymer.

The peak of Tan Delta curve of cellular pressure-sensitive adhesive membranes shows a shift to high frequencies, the Tan Delta being a ratio of the loss modulus to the storage modulus shows a shift to higher frequencies when compared to graphs of otherwise identical cellular pressure-sensitive adhesive membranes containing no elastomer or cellular pressure-sensitive adhesive membranes containing no elastomer or cellular pressure-sensitive adhesive membranes containing elastomers having unsaturated segments.

Other elastomers containing only saturated segments are also useful, i.e. Kraton TM 1726, 1650, also available from Shell.

The elastomer-containing cellular pressure-sensitive adhesive membranes of the invention exhibit a reduction in storage modulus, as tested by dynamic mechanical analysis. It is believed that this reduction is due to the reduction of the amount of crosslinking in the system. The elastomer in this system does not have many available sites for crosslinking because of the level of saturation of the segments; the extent of the phase interconnectivity is therefore relatively low. It should be noted, however, that during the manufacture of an unsaturated elastomer the hydrogenation may not be 100% completed. Individual samples will, therefore, having varying amounts of available sites for crosslinking. Therefore, there is typically some chemical connectivity between the phases even in compositions containing elastomers having only saturated segments.

Unsaturated hydrocarbon elastomers including styrene-butadiene elastomers such as other members of the Duradene TM 700 series, e.g., 711, 713, and 707, available commercially from Firestone; Finaprene TM 400 series available from Petrofina, including Finaprene TM 401, 411, 411P, 414 and Europren TM "SOL"T series available from Enichem such as Europren TM SOL T160 series, the SOL T190 series, and Kraton TM D1107 are not useful in compositions of the invention. They do not provide the improved internal strength of the elastomers containing only saturated segments.

Preferred cellular pressure-sensitive adhesive membrane compositions of the invention exhibit improved cold temperature performance when subjected to "cold slam" testing at temperatures of between −30° C. and −45° C. while exhibiting excellent adhesive performance.

In situ polymerization can be effected by ultraviolet radiation as taught in U.S. Pat. No. 4,181,752, (Martens et al.), by thermal polymerization or by electron beam as taught in U.S. Pat. No. 4,243,500 (Glennon), and U.S. Pat. No. 2,956,904 (Hendricks). However, photopolymerization by ultraviolet radiation is generally preferred.

Where photopolymerization is desirable, the acrylic foam membrane of the novel composites of the invention also contains a photoinitiator to induce polymerization of the monomers. Photoinitiators that are useful for polymerizing the acrylate monomer include the benzoin ethers, substituted benzoin ethers such as benzoin methyl ether or benzoin isopropyl ether, substituted acetophenones such as 2,2-diethoxy-acetophenone, and 2,2-dimethoxy-2-phenyl-acetophenone, substituted alpha-ketols such as 2-methyl-2-hydroxypropiophenone, aromatic sulphonyl chlorides such as 2-naphthalene sulphonyl chloride, and photoactive oximes such as 1-phenyl-1,2-propanedione-2-(O-ethoxycarbonyl) oxime. Generally, the photoinitiator is present in an amount of from about 0.01 part to about 1.0 part per 100 parts monomer weight (phr).

The photopolymerizable composition preferably contains a crosslinking agent to enhance the cohesive strength of the resulting foam membrane. Useful crosslinking agents which also function as photoinitiators are the chromophore-substituted halomethyl-s-triazines disclosed in U.S. Pat. Nos. 4,330,590 (Vesley) and 4,329,384 (Vesley et al.), incorporated herein by reference. Other suitable crosslinking agents include hydrogen abstracting carbonyls such as anthroquinone and benzophenone and their derivatives, as disclosed in U.S. Pat. No. 4,181,752 (Martens), and polyfunctional acrylates such as 1,6-hexanedioldiacrylate, trimethylolpropane triacrylate and 1,2-ethylene glycol diacrylate, as well as those disclosed in U.S. Pat. No. 4,379,201, (Heilmann), also incorporated herein by reference.

A cellular pressure-sensitive adhesive membrane of the invention is made by the steps of (a) frothing a surfactant containing composition which is polymerizable to a pressure-sensitive adhesive state, (b) coating the froth onto a backing, and (c) polymerizing the coated froth in situ to a pressure-sensitive adhesive state to provide a pressure-sensitive adhesive membrane having a cellular structure.

Frothing can be conveniently accomplished by whipping a gas into the polymerizable composition. After coating the frothed composition onto a backing, the polymerization may be initiated by ultraviolet radiation as taught in U.S. Pat. No. 4,181,752, (Martens et al.). Where such photopolymerization is desired, an inert frothing gas is preferably used as air tends to quench photopolymerization. Carbon dioxide and nitrogen are preferred frothing gases.

The acrylate composition can also be directly coated onto the backing, and simultaneously frothed and polymerized to obtain the cellular pressure-sensitive adhesive membrane.

The cellular pressure-sensitive adhesive membrane has a cellular structure providing at least 10% voids, said percentage being on a volume basis. The average size of the voids is about 10 micrometers in diameter. The percentage of voids is calculated as follows:
$d_u$ = the unfoamed density of the adhesive membrane
$d_f$ = the foamed density of the adhesive membrane
v = voids in adhesive membrane $$V = \frac{d_u - d_f}{d_u}$$

Regardless of the polymerization method, cellular pressure-sensitive adhesives of the invention include a surfactant in the composition. Preferred surfactants are those such as fluorochemicals known to be useful for foaming organic materials with low surface tension. By doing so, tapes with cellular adhesive membranes of good uniformity have been produces wherein the cells have an average diameter within the range of 0.05 to 0.3 mm. Typically, 90% of the cells of the adhesive membrane vary in size no more than 2:1, but some of the adhesive membranes have been characterized by significant variations in cell size. Products of the invention have been produced with cells as small as 0.01 mm and, when no surfactant was used, as great as 2 mm in diameter. Cellular adhesive membranes of the invention have been as 2.0 mm and as thick as 6.25 mm. Even thicker membranes can be produced if desired, particularly by ultraviolet irradiation of both faces.

It is not understood why some surfactants are more effective than others in producing a uniform cell structure, but the effective surfactants are those which reduce the surface energy of the syrup to below 30 dynes/cm$^2$. These surfactants are most effective when used in amounts ranging from 0.5 to 5% by weight of total solids. Either larger or smaller amounts might result in nonuniformity and appreciable numbers of cells exceeding the preferred maximum of 0.3 mm as well as reduced internal strength.

The surfactant also affects the dispersion of the elastomer within the acrylate system. When a pressure-sensitive adhesive containing no surfactant is compared to a pressure-sensitive adhesive containing surfactant, the latter has a differing morphology. This is true of both cellular pressure-sensitive adhesives and non-cellular pressure-sensitive adhesives.

The morphology of a noncellular pressure-sensitive adhesive containing no surfactant will also be phase-separated. However, the elastomer phase is not continuous, and the size and distributions of the inclusions are irregular when the elastomers used are those containing only saturated segments. Large regions of acrylic copolymer occur. The morphology of a noncellular pressure-sensitive adhesive containing a surfactant will exhibit a more regular distribution of the elastomer phase. The elastomer phase will be interconnected to the point of appearing continuous, and the inclusions, while not uniform in size, are much smaller.

The elastomer phase of a cellular pressure-sensitive adhesive will still exhibit increased interconnectivity. However, the distribution of the phase is disturbed, and the entire phase appears less connected to the acrylic phase. It is believed that the high shear, and gear-like teeth of the mixers used in the frothing procedure mechanically twists, deforms, and occasionally tears this phase. The interconnectivity of the elastomer within the phase is high, and it remains largely intact. However, the interconnectivity over systems without surfactant, of the elastomer phase to the acrylic phase is low, and the elastomer phase is torn away from the acrylic phase. However, the increase in phase interconnectivity, over systems without surfactant and the increased interconnection of the elastomeric phase is believed to result in the improved properties seen in pressure-sensitive adhesives of the invention.

Other materials which can be blended with the polymerizable mixture prior to coating include reinforcing agents and other modifiers, some of which may copolymerize with the polymerizable mixture or may polymerize separately. The types and amounts of these materials to be added must be selected such that the final foam membrane retains the required adhesive characteristics.

An especially useful type of filler material is hydrophobic silica as disclosed in U.S. Pat. Nos. 4,710,536 and 4,749,590, (Klingen et al.). In one preferred embodiment of the present invention, the acrylic pressure-sensitive adhesive foam layer further comprises from about 2 to about 15 phr of a hydrophobic silica having a surface area of at least 10 m$^2$/g.

Other useful filler materials include fibrous reinforcement strands, woven and nonwoven fabrics, dyes, pigments and other coloring agents, and viscosity adjusting agents.

In one embodiment of the invention, the cellular pressure-sensitive adhesive membrane comprises hollow microspheres, available microspheres include hollow glass and polymeric microspheres, and mixtures thereof. The use of glass microspheres is a nonpreferred embodiment as the addition of glass fillers appears to reduce the improvements in both internal strength and low temperature shock resistance of cellular pressure-sensitive adhesive membranes of the invention. Microspheres having an average diameter of 10 to 200 micrometers are commercially available and may be useful with various types of foam membranes of the invention. When used, microspheres may be blended into the foam composition in varying amounts prior to coating.

Useful glass microspheres include those disclosed in U.S. Pat. Nos. 4,223,067 (Levens), 4,666,771, (Vesley et al.), and 4,612,242 (Vesley et al.).

Useful hollow polymeric microspheres include those described in U.S. Pat. Nos. 3,615,972, 4,075,138, and 4,287,308. The microspheres are available from Kema Nord Plastics under the trade name "Expancel". In expanded form, the microspheres have a specific density of approximately 0.02–0.36 g/cc. It is possible to include the unexpanded microspheres in the pressure sensitive adhesive composition and subsequently heat them to cause expansion, but it is preferred to mix the expanded microspheres into the adhesive. This process makes it easier to ensure that the hollow microspheres in the final membrane are substantially surrounded by at least a thin layer of adhesive.

The pressure-sensitive adhesive of the invention is preferably prepared by dissolving or dispersing the elastomer into alkyl acrylate monomer, and then adding the polar copolymerizable monomer(s), and photoinitiator. Optional crosslinking agent may also be dissolved into the syrup.

Another method of preparation is to simply disperse or dissolve the elastomer into a mixture of the monomers and the photoinitiator, prior to or after partially polymerization, to form a syrup.

The elastomers appear to be dispersible with the photopolymerizable monomers when originally mixed. However, phase-separation is already present on a microscale, and as the monomers are reacted on the carrier web, the elastomer chains become less dispersible in the growing acrylic copolymer chains, resulting in an increased degree of phase-separation. As elastomers having only saturated segments are used, structural rearrangement is somewhat hindered, and the phase-separation results in large inclusions in the phases which are not uniform in size or distribution.

This composition is coated onto a flexible carrier web and polymerized in an inert, i.e., oxygen free, atmosphere, e.g., a nitrogen atmosphere. A sufficiently inert atmosphere can be achieved by covering a layer of the photoactive coating with a plastic film which is substantially transparent to ultraviolet radiation, and irradiating through that film in air using fluorescent-type ultraviolet lamps which generally give a total radiation dose of about 500 millijoules/cm$^2$. If, instead of covering the polymerizable coating, the photopolymerization is to be carried out in an inert atmosphere, the permissible oxygen content of the inert atmosphere can be increased by mixing into the polymerizable monomer an oxidizable tin compound as taught in U.S. Pat. No. 4,303,485, (Levens), incorporated herein by reference, which also teaches that such procedures will allow thick coatings to be polymerized in air. The coating of the tapes may be accomplished using any conventional means such as roller coating, dip coating or extrusion coating.

Pressure-sensitive adhesive tapes of the invention may contain more than one layer. Such multi-layered tapes include at least one layer of the phase-separated, surfactant containing cellular, pressure-sensitive adhesive. Such layer may have a thin layer of a different pressure-sensitive adhesive laminated thereto, so that the adhesive of the invention is being used as a backing or core layer. The additional layer or layers may be any conventional adhesive known in the art, however, acrylic adhesives are preferred. More preferably, additional adhesive layers include at least one alkyl acrylate monomer, and a strongly polar or moderately polar copolymerizable monomer.

In an especially preferred embodiment, the cellular pressure-sensitive adhesive membrane of the invention is used as a core layer, having laminated thereto a thin layer of a noncellular phase-separated ultraviolet-radiation polymerized pressure-sensitive adhesive containing (a) from about 65 parts to about 95 parts of an acrylic copolymer of monomers containing:
  (i) from about 60 to about 90 parts of an alkyl acrylate monomer, the alkyl groups of which have an average of 4 to 12 carbon atoms, and
  (ii) correspondingly, from about 40 parts to about 10 parts of a monoethylenically unsaturated polar copolymerizable monomer, and
  (iii) from about 0.01 part to about 1 part of a photoinitiator, (b) correspondingly, from about 35 parts to about 5 parts of a hydrocarbon elastomer or blend of hydrocarbon elastomers, each elastomer containing at least one unsaturated segment having a glass transition temperature lower than that of the acrylic copolymer, wherein the adhesive has at least a first phase and a second phase. The first phase consists primarily of the elastomer and preferably is a continuous phase. The second phase consists primarily of the acrylic copolymer. Such an adhesive may or may not contain a surfactant.

Where multilayer tape constructions are desirable, a preferred method of construction is multilayer coating, as described in U.S. Pat. No. 4,818,610 (Zimmerman et al.), incorporated herein by reference, wherein a plurality of copolymerizable coatable compositions is prepared, each composition containing at least one photopolymerizable monomer, one of the coatable compositions being the novel pressure-sensitive adhesive of the invention. The coatable compositions are coated to provide a plurality of superimposed layers with contiguous layers defining an interface therebetween, with the novel pressure-sensitive adhesive membrane of the invention being coated as a first or last layer. Migration of photopolymerizable monomers through the interface between contiguous layers is permitted, and the superimposed layers are then simultaneously irradiated. This provides polymeric chains comprised of copolymers of photopolymerizable monomers originating from contiguous layers extending through the interface therebetween, thereby producing a tape having layers which cannot be delaminated.

Test Methods

The following tests have been used to evaluate adhesives of the invention. All percentages, parts and ratios are by weight unless specifically stated otherwise.

Analysis of Adhesive Morphology by Transmission Electron Microscopy

The adhesive films are stained by exposing them to the vapors of a 0.5% aqueous solution of ruthenium tetroxide for 2 hours. This stain reacts preferentially with the polystyrene block in the copolymer; therefore the polystyrene blocks appear dark in the micrographs. Thin sections (500–1000 Angstroms) for TEM testing were prepared at a sample temperature of −140° C. using a Reichert-Jung TM Ultracut E TM ultramicrotome equipped with an FC4 cryoattachment. A Diatome TM diamond knife with a stainless steel boat was employed. The sections were floated off onto n-propanol and collected on 700 mesh copper grids. The stained sections were then examined using a JEOL 100 CX electron microscope in transmission mode operated at 100 kV.

T-Peel

T-Peel is measured by adhering a 1.25 cm. by 10.2 cm strip of the adhesive to be tested between two strips of anodized aluminum 15.2 cm long, and 0.125 mm thick, one side of which has a matte finish. The adhesive is adhered to the side having such matte finish. This composite sandwich is then rolled, two passes with a 2 kilogram roller and allowed to dwell for 24 hours. The free ends of the aluminum were clamped in the haws of an Instron TM adhesion tester and pulled apart at a rate of 30.5 cm/min. The force required to cause a foam split is reported in N/dm. Only cohesive failures are reported.

90° Peel Adhesion

A strip of anodized aluminum 15.2 cm long, 1.26 cm wide, and 0.125 mm thick is positioned on one adhesive face of a 1.26 cm×11.4 cm tape sample, the sample facing a matte surface. Pressure is applied to the aluminum by rolling with a 2 kg roller. The opposite face of the sample is then firmly bonded to a rigid stainless steel or painted substrate. After the specified dwell time, the sample is removed by pulling the aluminum strip at 90° to the adhesive surface at a speed of 30.5 cm/minute, noting the average adhesion in N/dm width, and the failure mode. All failures are adhesive unless otherwise noted.

Cold Slam

A rigid vertical steel frame approximately 40 cm square is provided at its upper edge with a similar dimensioned hinged frame/door. Medium density silicone foam measuring 19.4 square cm (2.54 cm×7.62 cm) is mounted at the lower outer edge of the fixed vertical frame (where the hinged door impacts when slammed).

Test panels are prepared as follows:

A 12.7 mm×125 mm pressure sensitive attachment tape, carried on a release liner, is applied to the 15 mm×150 mm face of a rigid polyvinyl chloride test bar which is 6 mm thick. The tape is pressed into place by rolling once with a 6.8 kg roller. The liner is then removed from the tape, and the exposed surface attached to a freshly painted steel panel which is 100 mm×300 mm. Four test bars are attached, in two rows, in the lengthwise direction of the steel panel, with one end of each test bar extending beyond the end of the panel approximately 2.5 cm. After rolling the test panel with a 6.8 kg roller at a rate of 300 mm/min, the panel is allowed to dwell for 3 days at ambient temperature. The specimen is then conditioned at −30° C. for approximately 12 hours in the cold chamber, which houses the cold slam fixture as described above. The test panel is then secured in the fixture, with the test bars and the long dimension of the panel mounted in a horizontal direction.

The following test procedure was designed so that some quantitative estimate of cold slam performance could be obtained, rather than simply a pass-fail rating.

The cold slam test is conducted by raising the hinged "door" to a predetermined angle, and releasing it, allowing it to strike the frame and expose the test panel to a cold shock. Ten slams are conducted at each of the five possible slam angles. The slam angle and the number of the slam (1–10) during which any of the four vinyl bars becomes delaminated or detached is recorded. A slam angle of 23 degrees is used initially. If there has been no failures after ten slams at this angle, the angle is increased to 45 degrees. This procedure is repeated until all test bars become detached, or until ten slams at the 180 degree slam angle has been conducted. If failure of one or more bars does occur at a specific stage during the initial ten slams, an additional 10 slams is conducted at that stage before advancing to the next slam angle. The results are recorded by documenting the door slam angle/stage and slam number in which delamination begins, or failure occurs. Numerical designation in the form of stages 1–5 correspond to door slam angles of 23, 45, 68, 90 and 180 degrees respectively. Again, alphabetical designation is assigned as follows: E=slams 1 through 3 of ten; M=slams 4–7 of ten; L=slams 8–10 of 10. LL=slams 10–20 of 20. The failure mode is also recorded.

The following examples are to be considered as illustrative in nature, and are not limiting in any way. The scope of the invention is that which is defined in the claims only.

EXAMPLES

The following terminology, trade names, designations, and abbreviations are used in the examples:

| GLOSSARY | |
|---|---|
| Elastomers | |
| Duradene TM 710 | a butadiene-styrene copolymer having 27% styrene, available from Firestone Company. |
| Kraton TM D1107 | a styrene-isoprene-styrene copolymer having 15% styrene, available from Shell Chemical Company. |
| Kraton TM 1650 | a styrene-ethylene butylene-styrene copolymer having 29% styrene, available from Shell Chemical Company. |
| Kraton TM G1657 | a styrene-ethylene butylene-styrene copolymer with 14% bound styrene, available from Shell Chemical Company. |
| Kraton TM G1726 | a blend of 30% styrene/ethylene-butylene/styrene triblock and 70% styrene/ethylene-butylene diblock copolymer, available from Shell Chemical Company. |
| Stereon TM 845A | a styrene-butadine multiblock copolymer with 48% styrene, available from Firestone Company. |
| Surfactants | |
| Surfactant B | $C_8F_{17}SO_2N(C_2H_5)(C_2H_4O)_7CH_3$ |
| Surfactant C | solution of fluoroaliphatic oligomer of Example 2 of U.S. Pat. No. 3,787,351 in ethyl acetate, 50% solids. |

Abbreviations
IOA — isooctyl acrylate
AA — acrylic acid
$T_g$ — glass transition temperature
FS — foam split
50J - a high solids automotive paint

EXAMPLE 1

A solution was prepared by dissolving Kraton TM 1657 in IOA, and adding acrylic acid to yield a 91/9/9 ratio of IOA/AA/Kraton. After the addition of acrylic acid to form the acrylate copolymer, a slight phase separation was indicated by a milky white appearance. The solution was thoroughly mixed, and for every 100 parts of IOA/AA was added 0.05 part HDDA, 0.1 part photoinitiator (KB-1 available from Sartomer), and 6 parts Aerosil TM 972 hydrophobic silica. The resulting mixture was thoroughly mixed, and degassed. The mixture was pumped into a 90 mm frother operating at 300–350 rpm. Concurrently, a 60:40 mixture of surfactants B and C and nitrogen were fed into the frother. As the frother was continually fed with nitrogen, the frothed mixture was delivered under 205 kPa pressure to the nip of a roll coater between a pair of sheets of transparent, biaxially-oriented polyethylene terephthalate, the facing surfaces of which had low adhesion coatings to a 40-mil thickness. The tubing was partially constricted by a clamp to provide a desired level of pressure in the frother.

The composite emerging from the roll coater was irradiated with a bank of Sylvania fluorescent black light bulbs, 90% of the emissions of which were between 300 and 400 nm, with a maximum of 351 nm. The exposure was 300 mJ from each side for a total of 600 mJ, as measured by a Dynachem Radiometer, which was spectrally responsive between 300 and 400 nm, maximum at 351 nm. This total did not include the irradiation adsorbed by the polyethylene terephthalate films. The composite was cooled by blowing air against both films during the irradiation to keep the temperature of the films below 85° C. to prevent wrinkling of the films.

The cellular pressure-sensitive adhesive membrane was tested for T-Peel, 90° Peel on paint (50J), stainless steel, and cold slam. The results are shown in Table 2.

EXAMPLES 2 to 6

These cellular pressure-sensitive adhesive membranes were made according to the procedure of Example 1. The compositions were varied in amounts of acrylic acid, and in the type and amount of elastomers having saturated segments which were used. The compositions are detailed in Table 1, and the test results in Table 2.

EXAMPLES 7 to 11

These cellular pressure-sensitive adhesive membranes were made according to Example 1 except that 8 pph C-15 glass microspheres, available from 3M, were added.

EXAMPLE 12

This cellular pressure-sensitive adhesive membrane was made according to the procedure of Example 1 except that the monomer ratios were varied, 0.08 part HDDA was used, and 2.2 parts of polymeric microspheres "551 DE" available from Expancel were added.

release coatings thereon, and covered by a second such film. The knife setting was adjusted to provide an uniform coating of about 1 mm. The compositions were then photopolymerized as described in Example 1. The resulting adhesive tape was tested in the same way as in Example 1. The results are shown in Table 4.

COMPARATIVE EXAMPLES C-2, and C-3

These noncellular pressure-sensitive adhesive tapes were prepared as described in Comparative Example 1. The compositions are shown in Table 3, and the test results are reported in Table 4.

COMPARATIVE EXAMPLES C-4 to C-6

These cellular pressure-sensitive adhesive tapes were made according to the method described in Example 1, except that no hydrocarbon elastomer was used. The composition are described in Table 3, and the test results are reported in Table 4.

COMPARATIVE EXAMPLES C-7 to C-9

These cellular pressure-sensitive adhesive tapes were made according to the method described in comparative Examples C-4 to C-6 except that 8 pph C-15 glass microspheres available from 3M were added to the composition prior to frothing. The compositions are described in Table 3, and the test results are reported in Table 4.

COMPARATIVE EXAMPLES C-10 to C-14

These comparative cellular pressure-sensitive adhesive tapes were made according to the method described in Comparative Examples C-4 and C-6 except that varying hydrocarbon elastomers having unsaturated segments were used. The compositions are described in Table 3, and the test results are reported in Table 4.

TABLE 1

| Example No. | IOA/AA Ratio | Density Kg/m³ | Elastomer Type | PPH |
|---|---|---|---|---|
| 1 | 90/10 | 806 | K1657 | 9 |
| 2 | 90/10 | 693 | K1650 | 9 |
| 3 | 90/10 | 758 | K1726 | 9 |
| 4 | 100/0 | 758 | K1657 | 10 |
| 5 | 85/15 | 758 | K1657 | 8 |
| 6 | 85/15 | — | K1657 | 22 |
| 7 | 90/10 | 596 | K1657 | 9 |
| 8 | 90/10 | 596 | K1650 | 9 |
| 9 | 90/10 | 596 | K1726 | 9 |
| 10 | 85/15 | 565 | K1657 | 8 |
| 11 | 80/20 | 500 | K1657 | 8 |
| 12 | 93/7 | 587 | K1657 | 9 |

TABLE 2

| Example No. | T-Peel N/dm | 90° Peel* 72 Hr/SS | Stress kPa | Strain % | Peel* 72 Hr/50J** | Cold Slam −38° C./50J** |
|---|---|---|---|---|---|---|
| 1 | 293 | 212 | 372 | 1112 | 171 | 4M, LL, 5E |
| 2 | 158 | 204 | 1067 | 816 | — | — |
| 3 | 258 | 230 | 468 | 1093 | — | — |
| 4 | 83 | 57 | 96 | 1700 | — | — |
| 5 | 337 | 261 | 1302 | 923 | 204 | 0–4D, 3E, LL |
| 6 | 318 | 401 | 1309 | 933 | 280 | — |
| 7 | 175 | 291 | 689 | 799 | — | — |
| 8 | 230 | 269 | 316 | 1099 | 236 | 4E, 5E |
| 9 | 212 | 289 | 530 | 1107 | — | — |
| 10 | 212 | 300 | 881 | 914 | — | 0–1D, 3E |
| 11 | 72 | 138 | 69 | 594 | 0 | — |
| 12 | 320 | 125 | 350 | 978 | — | — |

*Newtons/decimeter
**a high solids paint, 50J

COMPARATIVE EXAMPLE 1

A noncellular pressure-sensitive adhesive was prepared having a composition of 90 parts IOA, 10 parts acrylic acid, 0.05 pph HDDA, 0.1 pph of 2,2-dimethyl-2-phenyl acetophenone, and 6 pph of Aerosil ™ R972, along with 8 pph of C-15 glass microspheres, available from Minnesota Mining and Manufacturing (3M), which were dispersed into the compounded adhesive before coating. No surfactant was added. This was coated onto a biaxially-oriented 0.05 mm thick PET film, the facing surfaces of which had low-adhesion

TABLE 3

| Example No. | IOA/AA Ratio | Density Kgm/m³ | Elastomer Type | PPH |
|---|---|---|---|---|
| C-1 | 90/10 | 758 | — | — |
| C-2 | 90/10 | 742 | K1657 | 9 |
| C-3 | 90/10 | 742 | STEREON | 9 |
| C-4 | 90/10 | 758 | — | — |
| C-5 | 85/15 | 790 | — | — |
| C-6 | 100 | 790 | — | — |
| C-7 | 90/10 | 581 | — | — |
| C-8 | 85/15 | 581 | — | — |
| C-9 | 80/20 | 516 | — | — |
| C-10 | 90/10 | 758 | ST845 | 9 |
| C-11 | 90/10 | 806 | ST845 | 22 |
| C-12 | 85/15 | — | D 710 | 8.5 |
| C-13 | 85/15 | — | D-710 | 17 |

TABLE 3-continued

| Example No. | IOA/AA Ratio | Density Kgm/m³ | Elastomer Type | PPH |
|---|---|---|---|---|
| C-14 | 85/15 | — | D-710 | 30 |

TABLE 4

| Example No. | T-Peel N/dm | 90° Peel* 72 Hr/SS | Stress kPa | Strain % | Peel* 72 Hr/50J** | Cold Slam −38° C./50J** |
|---|---|---|---|---|---|---|
| C-1 | 353 | 537 | 932 | 911 | 245 | 2L, 3E |
| C-2 | 445 | 410 | 744 | 812 | 267 | 3E, 4M |
| C-3 | 374 | 543 | 1288 | 643 | 399 | |
| C-4 | 140 | 263 | 269 | 1084 | 226 | 3L, LL, 4M, 5E |
| C-5 | 226 | 497 FS | 620 | 717 | 232 | 0–1D, 2EL, LL, 3E |
| C-6 | 28 | 92 | 103 | 1200 | — | — |
| C-7 | 206 | 319 | 400 | 1076 | 293 | 3E, LL |
| C-8 | 193 | 374 FS | 751 | 795 | — | 0-3D, 2ML, LL, 4E |
| C-9 | 83 | 101 FS | 469 | 534 | — | — |
| C-10 | 149 | 318 | 696 | 746 | 215 | 4E, LL, 5 |
| C-11 | 177 | 269 | 1123 | 400 | — | — |
| C-12 | 276 | 438 FS | 930 | 624 | 261 | — |
| C-13 | 272 | 315 | 1522 | 568 | — | — |
| C-14 | 197 | 291 | 661 | 450 | — | — |

*Newtons/decimeter
**a high solids paint, 50J.

Comparative Example C-4 is identical to Example 1 except for the inclusion of the elastomer. The increase in internal strength is demonstrated by a doubled T-peel, and increased stress and strain values. C-5 is comparable to Example 5; again the tape of the invention exhibits increased internal strength. Even when a very internally weak composition, i.e., 100% alkyl acrylate monomer is used (C-6 and 4), the example of the invention shows improvement in internal strength.

In Examples 7–11 and C-7 to C-9, it can be seen that some improvement results in internal strength when glass microbubbles are used, but that the improvement is smaller.

TABLE 5

| Example No. | T-Peel N/dm | 90° Peel* 72 Hr/SS | Stress kPa | Strain % | Peel* 72 Hr/50J** | Cold Slam −38° C./50J** |
|---|---|---|---|---|---|---|
| 1 | 293 | 212 | 372 | 1112 | 171 | 4M, LL, 5E |
| C-4 | 140 | 263 | 269 | 1084 | 226 | 3L, LL, 4M, 5E |
| C-10 | 149 | 318 | 696 | 746 | 215 | 4E, LL, 5 |
| C-11 | 177 | 269 | 1123 | 400 | — | — |
| 5 | 337 | 261 | 1302 | 923 | 204 | 0–4D, 3E, LL |
| C-12 | 276 | 438 FS | 930 | 624 | 261 | — |
| C-13 | 272 | 315 | 1522 | 568 | — | — |
| C-14 | 197 | 291 | 661 | 450 | — | — |

Examples C-10 to C-14 show that tapes containing elastomers having unsaturated segments do not improve the internal strength of the cellular pressure sensitive adhesive membranes even when larger quantities are used.

Examples C-4, C-10 and C-11 should be compared with Example 1. Examples C-12 to C-14 should be compared to Example 5. Example C-4 contains no elastomer. Examples C-10 and C-11 contain 9 and 22 parts respectively of Stereon ™ 845A, an elastomer containing unsaturated segments. At 9 parts, no improvement in internal strength is seen, even at 22 parts, only minimal improvement is seen when compared to Example 1, having 9 parts of a saturated elastomer.

Examples C-12 through C-14 use a different elastomer having saturated segments, Duradene ™ 710, 8.5, 17, and 30 parts respectively. These do not show the internal strength of Example 5.

What is claimed is:

1. A phase-separated cellular pressure-sensitive adhesive membrane surrounding and thereby defining a multiplicity of small voids, constituting from 15% to 85% of the volume of said membrane, said membrane possessing improved internal strength and a high degree of compression recovery, said membrane consisting essentially of
   (a) from about 70 parts to about 98 parts of an acrylic polymer of monomers containing:
      (i) at least about 75 parts of an alkyl acrylate monomer, the alkyl groups of which contain from 1 to 14 carbon atoms, having an average of 4 to 12 carbon atoms,
      (ii) from 0 to about 25 parts of a monoethylenically unsaturated polar copolymerizable monomer,
      (iii) from about 0.01 part to about 1 part of a photoinitiator, and
      (iv) from about 0.1 part to about 5 parts of a surfactant,
   (b) correspondingly, from about 30 parts to about 2 parts of a hydrocarbon elastomer or blend of hydrocarbon elastomers containing only saturated segments, containing at least one segment having a lower $T_g$ than the acrylic copolymer,
   wherein the adhesive has at least a first phase and a second phase, the first phase consisting primarily of the elastomer, phase consisting primarily of the acrylic, at least one phase being a continuous phase.

2. The phase-separated cellular pressure-sensitive adhesive membrane of claim 1 wherein the average diameter of the cells of the cellular membrane does not exceed 0.3 mm.

3. The phase-separated cellular pressure-sensitive adhesive membrane of claim 1 wherein said second phase is a continuous phase.

4. The phase-separated cellular pressure-sensitive adhesive membrane of claim 1 wherein said segment of said elastomer having a lower glass transition temperature than the ultraviolet-radiation polymerized polymer comprises at least 50% by weight of the elastomer.

5. The phase-separated cellular pressure-sensitive adhesive membrane of claim 1 wherein said elastomer comprises from about 5 parts to about 15 parts of said adhesive.

6. The phase-separated cellular pressure-sensitive adhesive membrane of claim 1 wherein said elastomer is a styrene-ethylene butylene-styrene block copolymer.

7. The phase-separated cellular pressure-sensitive adhesive membrane of claim 1, said adhesive having been ultraviolet polymerized.

8. The phase-separated ultraviolet-radiation polymerized cellular pressure-sensitive adhesive membrane of claim 1 wherein said surfactant is a fluorochemical surfactant.

9. The phase-separated cellular pressure-sensitive adhesive membrane of claim 1 further comprising from about 2 parts to about 15 parts of a hydrophobic silica having a surface area of at least 10 $m^2/gm$.

10. The phase-separated cellular pressure-sensitive adhesive membrane of claim 1 wherein said adhesive further comprises from about 0.01 to about 1 part of a crosslinking agent.

11. The phase-separated cellular pressure-sensitive adhesive of claim 10 wherein said crosslinking agent is selected from the group consisting of multifunctional acrylates.

12. The phase-separated ultraviolet-radiation cellular pressure-sensitive adhesive membrane of claim 1 wherein said adhesive further comprises hollow polymeric microspheres.

13. The phase-separated ultraviolet-radiation polymerized cellular pressure-sensitive adhesive membrane of claim 1 wherein the acrylic copolymer comprises
(a) from about 75 parts to about 99 parts of an alkyl acrylate ester selected from the group consisting of isooctyl acrylate, isononyl acrylate, decyl acrylate, dodecyl acrylate, butyl acrylate, ethyl-hexyl acrylate and hexyl acrylate; and
(b) correspondingly, from about 25 parts to about 1 part of a monoethylenically unsaturated polar copolymerizable monomer selected from the group consisting of acrylic acid, and N-vinylpyrrolidone.

14. The phase-separated cellular pressure-sensitive adhesive membrane of claim 1 wherein the acrylic copolymer comprises
(a) from about 85 parts to about 99 parts isooctyl acrylate; and
(b) correspondingly, from about 1 part to about 15 parts acrylic acid.

15. The phase-separated cellular pressure-sensitive adhesive membrane of claim 1 wherein the acrylic copolymer comprises
(a) from about 75 parts to about 99 parts isooctyl acrylate; and
(b) correspondingly, from about 25 parts to about one part N-vinyl pyrrolidone.

16. A pressure-sensitive adhesive tape comprising the phase-separated cellular pressure-sensitive adhesive membrane of claim 1 having at least one surface adhered to a flexible carrier web.

17. A pressure-sensitive adhesive tape comprising the phase-separated cellular pressure-sensitive adhesive membrane of claim 13 having at least one surface adhered to a flexible carrier web.

18. A pressure-sensitive adhesive tape comprising
(a) a core layer consisting of the phase-separated polymerized cellular pressure-sensitive adhesive membrane of claim 1, and
(b) a layer of a pressure-sensitive adhesive laminated to at least one surface thereof.

19. A phase-separated, ultraviolet-radiation polymerized, cellular pressure-sensitive adhesive membrane surrounding and thereby defining a multiplicity of small voids, constituting from 15% to 85% of the volume of said membrane, said membrane possessing improved internal strength and a high degree of compression recovery, said membrane consisting essentially of
(a) from about 85 parts to about 95 parts of an acrylic polymer of monomers containing:
(i) from about 75 about 98 parts isooctyl acrylate of an alkyl acrylate monomer, the alkyl groups of which contain from 1 to 14 carbon atoms, having an average of 4 to 12 carbon atoms,
(ii) from 2 parts to about 25 parts of acrylic acid,
(iii) from about 0.01 part to about 1 part of a photoinitiator, and
(iv) from about 0.1 part to about 5 parts surfactant;
(b) correspondingly, from about 15 parts to about 5 parts of a styrene-ethylene butylene-styrene elastomer or blend of hydrocarbon elastomers;
wherein the adhesive has at least a first phase and a second phase, the first phase consisting primarily of the elastomer, said second phase consisting primarily of the acrylic and being a continuous phase.

* * * * *

UNITED STATES PATENT AND TRADEMARK OFFICE
CERTIFICATE OF CORRECTION

PATENT NO. : 5,024,880

DATED : June 18, 1991

INVENTOR(S) : George F. Vesley, Jurgen Klingen, and Donald T. Landin

It is certified that error appears in the above-identified patent and that said Letters Patent is hereby corrected as shown below:

ON TITLE PAGE:

On the inventors' line, "Veasley" should read --Vesley--.

Signed and Sealed this

Thirteenth Day of October, 1992

*Attest:*

DOUGLAS B. COMER

*Attesting Officer*   *Acting Commissioner of Patents and Trademarks*